(12) United States Patent
Goto

(10) Patent No.: US 11,756,710 B2
(45) Date of Patent: Sep. 12, 2023

(54) WIRE HARNESS MANUFACTURING METHOD, WIRE HARNESS, AND PROTECTIVE MEMBER

(71) Applicant: Yazaki Corporation, Tokyo (JP)

(72) Inventor: Yuki Goto, Aichi (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/747,194

(22) Filed: May 18, 2022

(65) Prior Publication Data
US 2022/0392671 A1 Dec. 8, 2022

(30) Foreign Application Priority Data
Jun. 7, 2021 (JP) ................................. 2021-094837

(51) Int. Cl.
*H01B 13/012* (2006.01)
*H01B 7/00* (2006.01)
*B60R 16/02* (2006.01)

(52) U.S. Cl.
CPC ..... *H01B 13/01263* (2013.01); *H01B 7/0045* (2013.01); *H01B 13/012* (2013.01); *B60R 16/0207* (2013.01)

(58) Field of Classification Search
CPC ............ H01B 13/012; H01B 13/01263; H01B 7/0045; B60R 16/0207; B60R 16/0215; H02G 3/04; H02G 3/30; H02G 3/32; H02G 3/0418; H02G 3/0437; H02G 3/0481; F16L 3/137; H05K 7/1447; H05K 7/1491
See application file for complete search history.

(56) References Cited

U.S. PATENT DOCUMENTS

| | | | | |
|---|---|---|---|---|
| 5,401,905 A | * | 3/1995 | Lesser | H02G 3/26 174/101 |
| 6,294,736 B1 | * | 9/2001 | Takeda | H02G 3/30 174/99 R |
| 7,390,967 B2 | * | 6/2008 | Daito | H02G 3/32 174/72 A |

FOREIGN PATENT DOCUMENTS

JP 2010-051096 A 3/2010
JP 2015220919 A * 12/2015 ............. H01T 21/02

* cited by examiner

*Primary Examiner* — Paresh Paghadal
(74) *Attorney, Agent, or Firm* — Sughrue Mion, PLLC

(57) ABSTRACT

A wire harness manufacturing method includes: an insertion step of inserting a binding member into an insertion hole of a protective member including a base member forming a routing space, the insertion hole provided in the base member and into which the binding member is insertable, and a temporary holding part provided on an outer surface of the base member and capable of temporarily holding an end of the binding member in a state in which the binding member is inserted into the insertion hole; a temporary holding step of temporarily holding the end of the binding member; a routing step of routing an electric wire in the routing space; and a binding step of removing the end of the binding member from the temporary holding part, and binding the electric wire to the base member by the binding member.

5 Claims, 7 Drawing Sheets

FIG.7
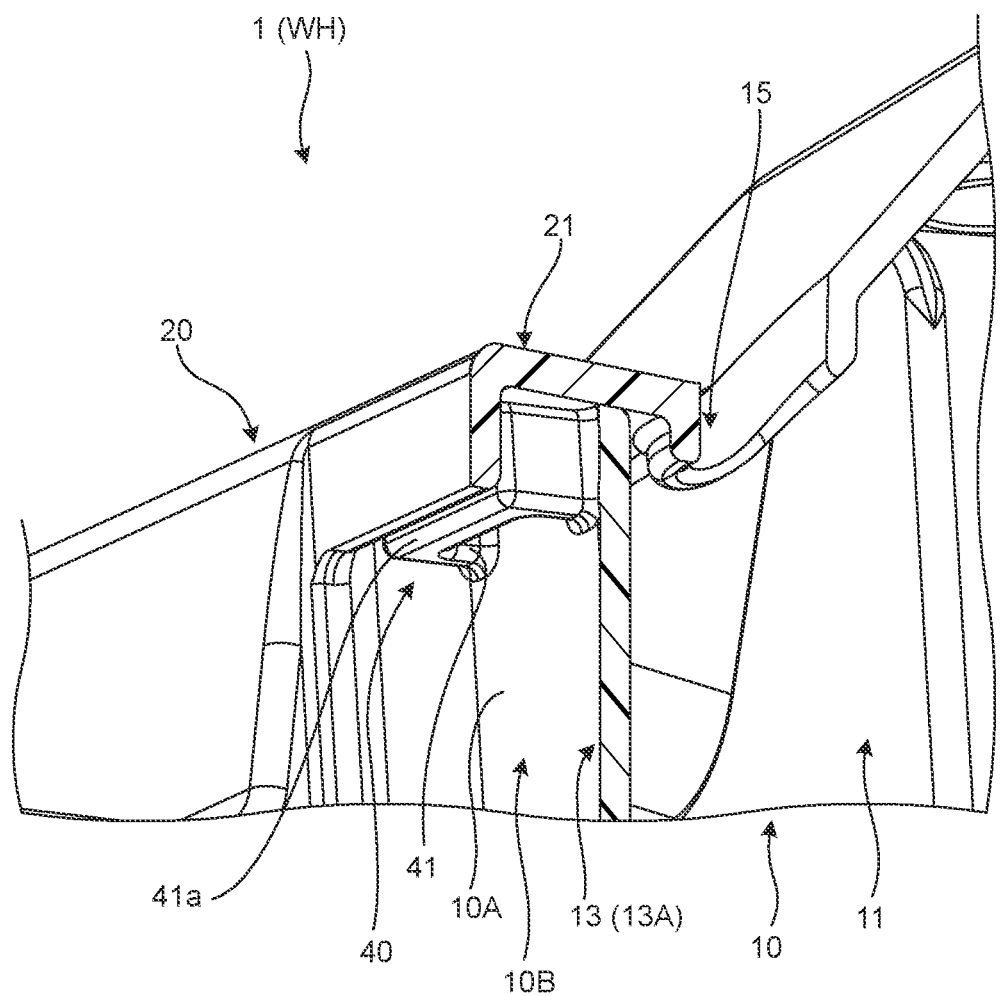
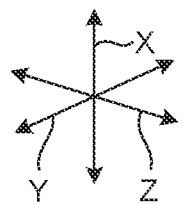

WIRE HARNESS MANUFACTURING METHOD, WIRE HARNESS, AND PROTECTIVE MEMBER

CROSS-REFERENCE TO RELATED APPLICATION(S)

The present application claims priority to and incorporates by reference the entire contents of Japanese Patent Application No. 2021-094837 filed in Japan on Jun. 7, 2021.

BACKGROUND OF THE INVENTION

1. Field of the Invention

The present invention relates to a wire harness manufacturing method, a wire harness, and a protective member.

2. Description of the Related Art

For example, Japanese Patent Application Laid-open No. 2010-051096 discloses a protector in which a wire passage is formed of a bottom wall and side walls projecting from both edges of the bottom wall in a width direction. In the protector, the wire passage is divided by a dividing wall standing at the longitudinal end of the bottom wall. The protector is provided with two or more pass-through holes for fastening bands on at least one of the bottom wall and the side wall at a position along the tip opening of each of the divided wire passages. The protector is configured such that a band piece of one fastening band is continuously passed through the two pass-through holes, and then wrapped around the group of electric wires inserted in the wire passage to fasten and secure it.

In the meantime, the protector disclosed in Japanese Patent Application Laid-open No. 2010-051096 mentioned above has room for further improvement in terms of, for example, improvement of workability in routing and binding of electric wires.

SUMMARY OF THE INVENTION

The present invention has been made in consideration of the circumstances described above, and an object of the present invention is to provide a wire harness manufacturing method, a wire harness, and a protective member capable of properly binding electric wires.

In order to achieve the above mentioned object, a wire harness manufacturing method according to one aspect of the present invention includes an insertion step of inserting a binding member into an insertion hole of a protective member, the protective member including a base member forming a routing space in which an electric wire is routed, the insertion hole provided in the base member and into which the binding member is insertable across inside and outside of the routing space, and a temporary holding part provided on an outer surface of the base member and capable of temporarily holding an end of the binding member in a state in which the binding member is inserted into the insertion hole; a temporary holding step of temporarily holding the end of the binding member in the state of being inserted into the insertion hole in the temporary holding part; a routing step of routing the electric wire in the routing space in a state in which the end of the binding member is temporarily held in the temporary holding part; and a binding step of removing the end of the binding member in the state of being temporarily held in the temporary holding part from the temporary holding part, and binding the electric wire in a state of being routed in the routing space to the base member by the binding member.

In order to achieve the above mentioned object, a wire harness according to another aspect of the present invention includes an electric wire; a protective member inside which the electric wire is routed; and a binding member binding the electric wire routed inside the protective member to the protective member, wherein the protective member includes: a base member forming a routing space in which the electric wire is routed; an insertion hole provided in the base member and into which the binding member is insertable across inside and outside of the routing space; and a temporary holding part provided on an outer surface of the base member and capable of temporarily holding an end of the binding member in a state in which the binding member is inserted into the insertion hole.

In order to achieve the above mentioned object, a protective member according to still another aspect of the present invention includes a base member forming a routing space in which an electric wire is routed; an insertion hole provided in the base member and into which a binding member is inserted across inside and outside of the routing space; and a temporary holding part provided on an outer surface of the base member and temporarily holding an end of the binding member in a state in which the binding member is inserted into the insertion hole.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a cross-sectional perspective view including a temporary holding cover part of a protective member provided in the wire harness according to the embodiment.

DETAILED DESCRIPTION OF THE PREFERRED EMBODIMENTS

The following is a detailed description of an embodiment of the present invention based on the drawings. The invention is not limited to the embodiment. The constituent elements in the following embodiment include elements replaceable and easy to be replaced by the skilled person, or substantially the same ones.

Figure 1:
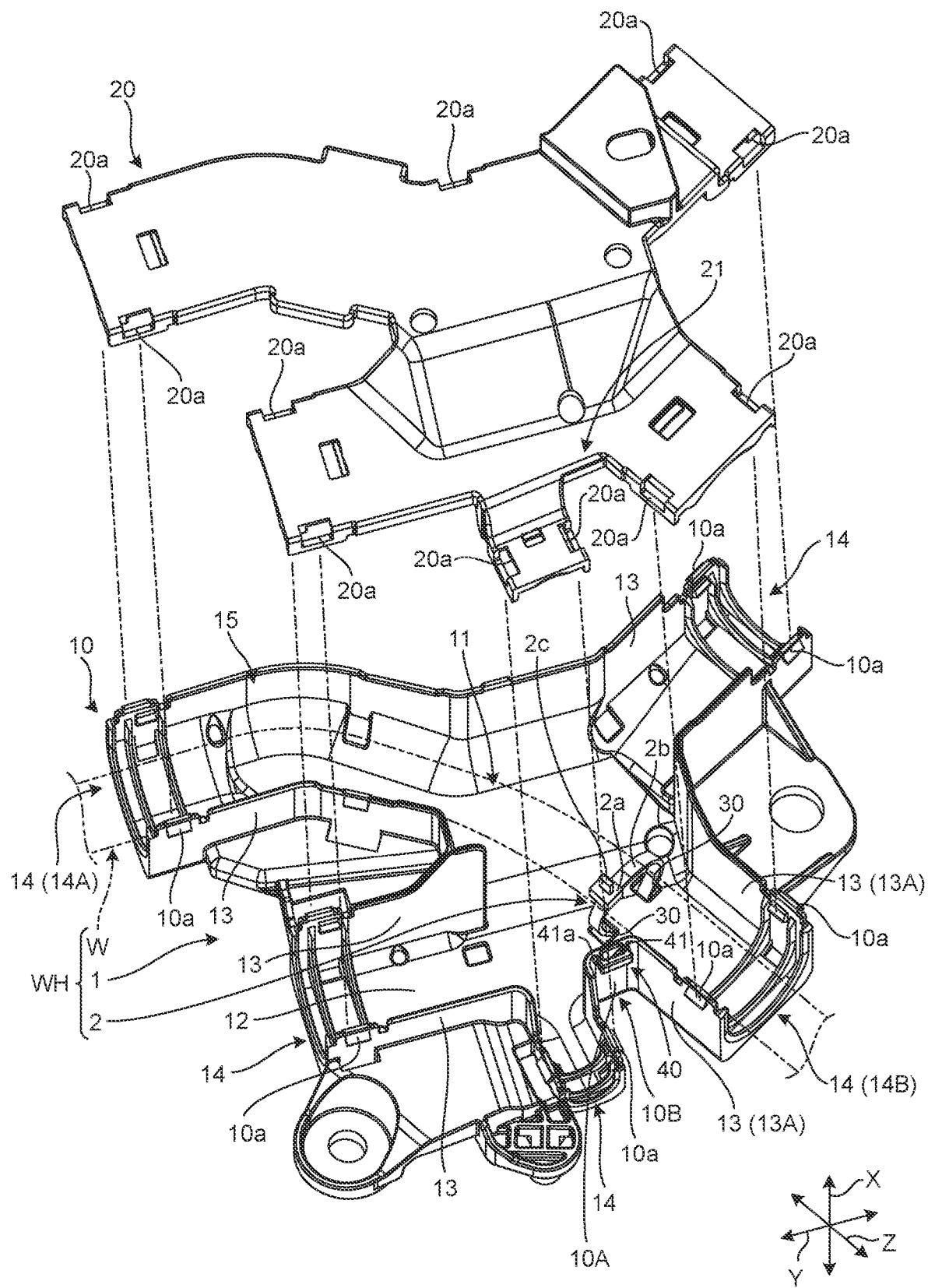
FIG. 1 is a per view illustrating a schematic configuration of a wire harness according to an embodiment.
Figure 2:
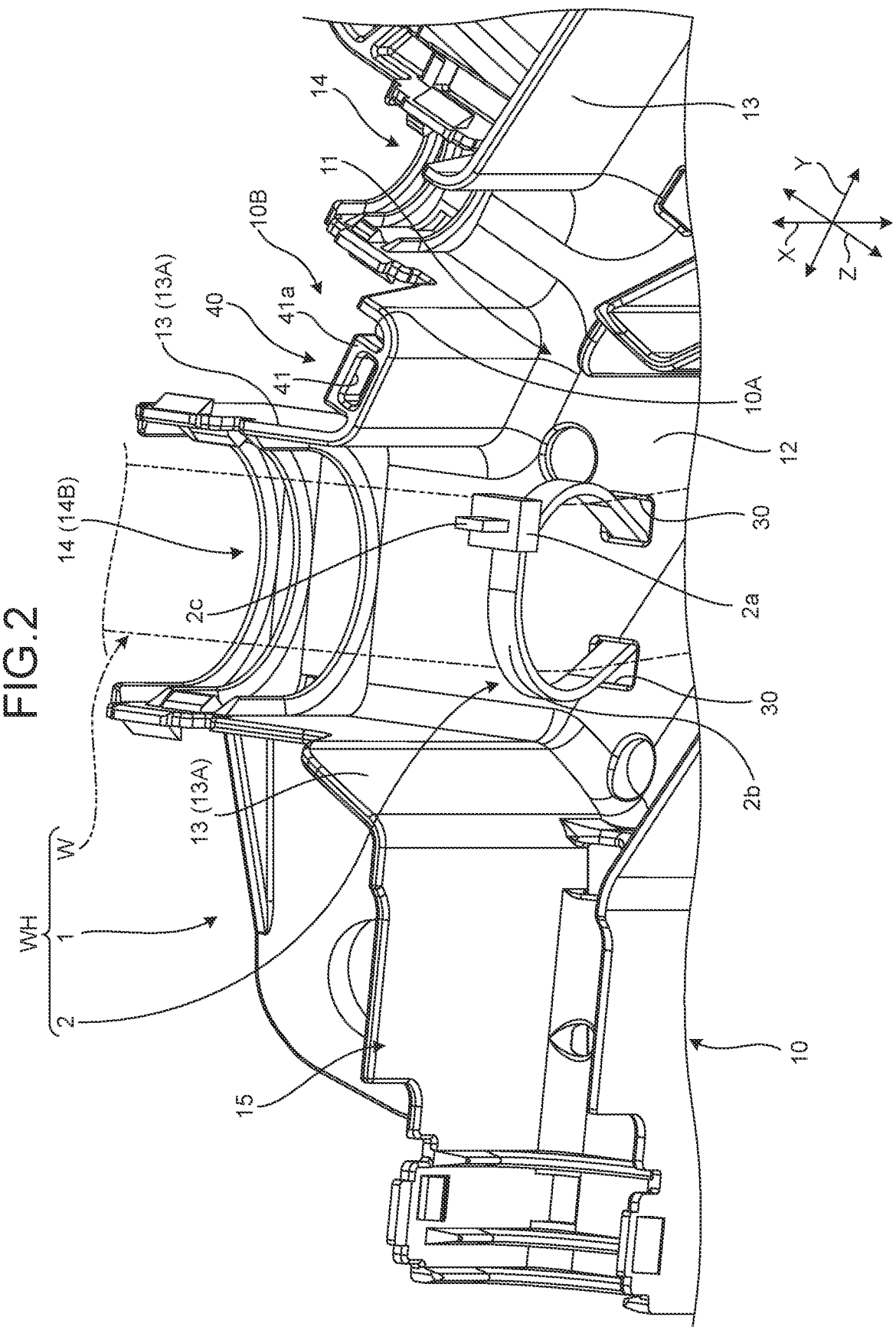
FIG. 2 is a partial perspective view illustrating the schematic configuration of the wire harness according to the embodiment.
Figure 3:
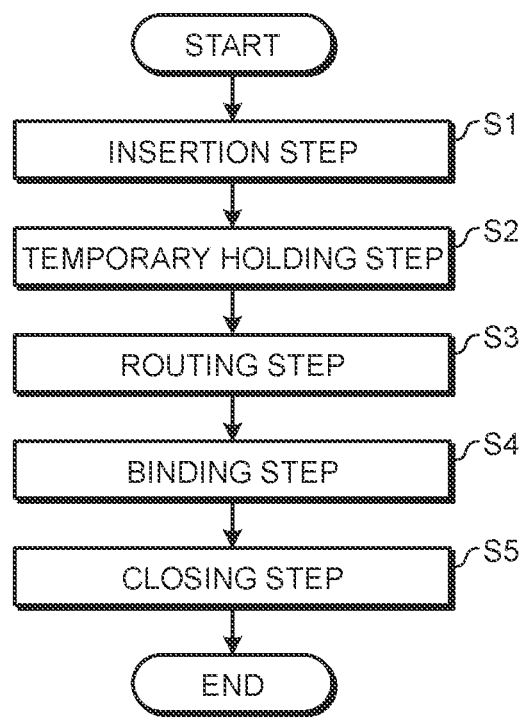
FIG. 3 is a flowchart illustrating a wire harness manufacturing method according to the embodiment.
Figure 6:
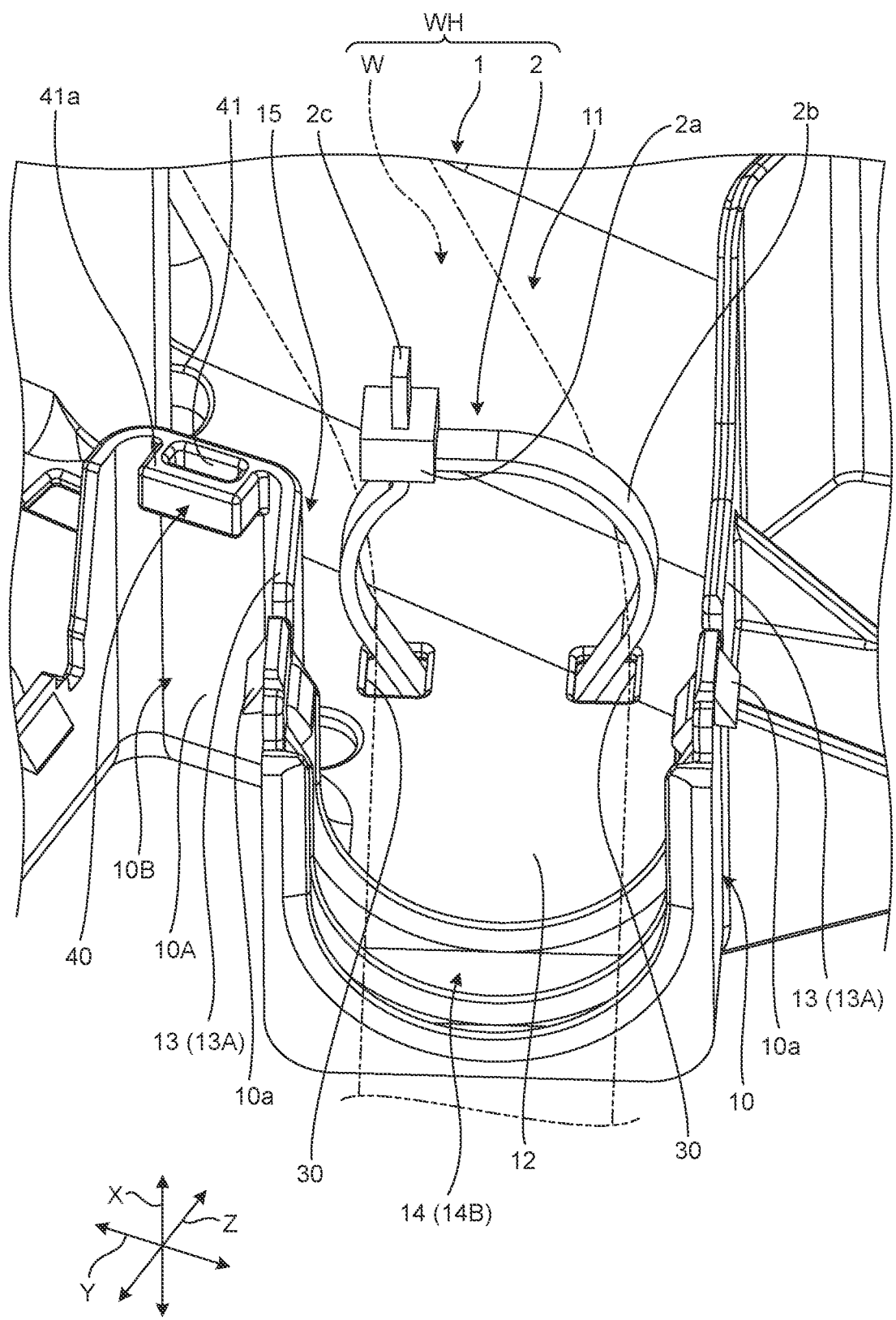
FIG. 6 is a partial perspective view illustrating the wire harness manufacturing method according to the embodiment.

In FIGS. 1, 2, and 6 explained below, some of the electric wires are illustrated by omitting them with double-dotted lines. In the following description, the mutually orthogonal (intersecting) first, second, and third directions are referred to as "first direction X", "second direction. Y", and "third direction Z", respectively. For example, the first direction X typically corresponds to a stacking direction in which the base member and the cover member are stacked. Each of directions used in the following explanation is described as the direction in a state in which components are mutually assembled, unless otherwise noted.

EMBODIMENT

A wire harness manufacturing method according to the present embodiment is used to manufacture a wire harness WH illustrated in FIG. 1, for example. In the following, a basic structure of the wire harness WH illustrated in FIG. 1, for example, is first explained, followed by a detailed description of the wire harness manufacturing method.

The wire harness WH illustrated in FIGS. 1 and 2, for example, includes a plurality of electric wires W used for power supply, and signal communication, which are bundled together to form a collective component for connection between devices mounted on a vehicle, and the electric wires W are connected to the devices by connectors or the like. The wire harness WH of the present embodiment includes electric wires W, a protective member 1, and a binding member 2. Each of the electric wires W is an electrically conductive routing material, for example, an insulated electric wire formed of a core wire formed of a plurality of metal strands bundled together and covered with an insulating coating portion. Each of the electric wires W may be a bundle of several wires. The protective member 1 is incorporated into the wire harness WH, and is exteriorly attached to the electric wires W, with the electric wires W inserted and routed inside, to protect the electric wires W routed inside and to regulate the routing path of the electric wires W. The protective member 1 is also referred to as an armor member or a protector. The binding member 2 binds the electric wires W routed inside the protective member 1 to the protective member 1. The binding member 2 is, for example, a banding band, and includes a head part 2a and a band part 2b extending from the head part 2a. The binding member 2 binds and fixes the electric wires W to the protective member 1 by causing the band part 2b wound around the electric wires W and the protective member 1 to be locked in the head part 2a. The wire harness WH may further include various components, such as grommets, an electrical connection box, fixtures, and connectors.

In the wire harness WH illustrated in the present embodiment, a temporary holding part 40 is formed in the protective member 1 to temporarily hold the band part 2b of the binding member 2 when the electric wires W are routed inside, thereby improving the workability when the electric wires W are routed and bound. The configuration of the protective member 1 is described in detail below with reference to the drawings.

Specifically, the protective member 1 includes a base member 10, a cover member 20, insertion holes 30, and a temporary holding part 40, as illustrated in FIGS. 1 and 2. The base member 10 and the cover member 20 are formed separately of resin material having insulation properties, and when assembled to each other, they form a routing space 11 in which electric wires W are routed inside. The insertion hole 30 and the temporary holding part 40 are both integrally formed in the base member 10.

The base member 10 is a main member forming the routing space 11, and forms a main body of the protective member (protector). The base member 10 includes a bottom portion 12 and side walls 13. The bottom portion 12 is formed in a plate shape having a thickness direction extending along the first direction X. The bottom portion 12 is formed in a shape corresponding to the shape of the required routing space 11. Each of the side walls 13 is formed in a plate shape by projecting from the bottom portion 12 to one side along the first direction X. A plurality of side walls 13 are provided, each of which has various shapes including concave, convex, curved, or bent portions. In the base member 10, an inner space portion enclosed by the bottom portion 12 and the side walls 13 forms the routing space 11. The routing space 11 is a space in which the electric wires W are inserted and located, and forms a routing path branched into a plurality of paths by the side walls 13 having various shapes. The base member 10 has a plurality of routing openings 14 corresponding to the routing paths. In this case, five routing openings 14 are provided. Each of the routing openings 14 is an opening into which the electric wires W to be routed in the routing path of the routing space 11 are inserted. Each of the routing openings 14 is formed of the bottom portion 12 and the side walls 13, and opens along the direction intersecting the first direction X. The base member 10 has an opening 15 opened on one side along the first direction X in the routing space 11. The opening 15 is formed at the end of one side of the side walls 13 in the first direction X, i.e., the end opposite to the bottom portion 12 side.

The cover member 20 is a member covering the opening 15 of the base member 10 and forming a protective member (protector) cover. The cover member 20 is formed in a plate shape having the thickness direction extending along the first direction X The cover member 20 has a shape corresponding to the shape of the opening 15 such that it can cover the opening 15. The cover member 20 is mounted to the base member 10 and covers (closes) the opening 15 with a plurality of locking holes 20a respectively locked at locking hook portions 10a of the base member 10.

Each of the insertion holes 30 is provided in the base member 10 and is a hole into which the binding member 2 can be inserted across inside and outside of the routing space 11. The insertion holes 30 are located and provided on the routing path of the electric wires W in the routing space 11. As an example, each of the insertion holes 30 is located and provided on the routing path formed across a first routing opening 14A and a second routing opening 14B among the routing openings 14, and the binding member 2 is provided for binding and fixing the electric wires W routed in the routing path to the base member 10. Here, the first routing opening 14A is located on one side of the second direction Y and one side of the third direction Z among the routing openings 14, while the second routing opening 14B is located on the other side of the second direction Y and the other side of the third direction Z to be opposed to the first routing opening 14A. Each of the insertion hole 30 is provided in the bottom portion 12 of the base member 10 and in the vicinity of the portion sandwiched between a pair of side walls 13A forming the second routing opening 14B among the side walls 13. Each of the insertion holes 30 is formed to extend through the bottom portion 12 along the first direction X, and connects the inside and the outside of the routing space 11. A pair of insertion holes 30 is provided for each binding member 2. A pair of insertion holes 30 are formed in the bottom portion 12 with an interval therebetween in the direction intersecting the routing path of the electric wires W. Here, as an example, each of insertion holes 30 forming a pair is formed in a substantially rectangular shape into which the band part 2*b* of the binding member 2 can be inserted.

Figure 5:
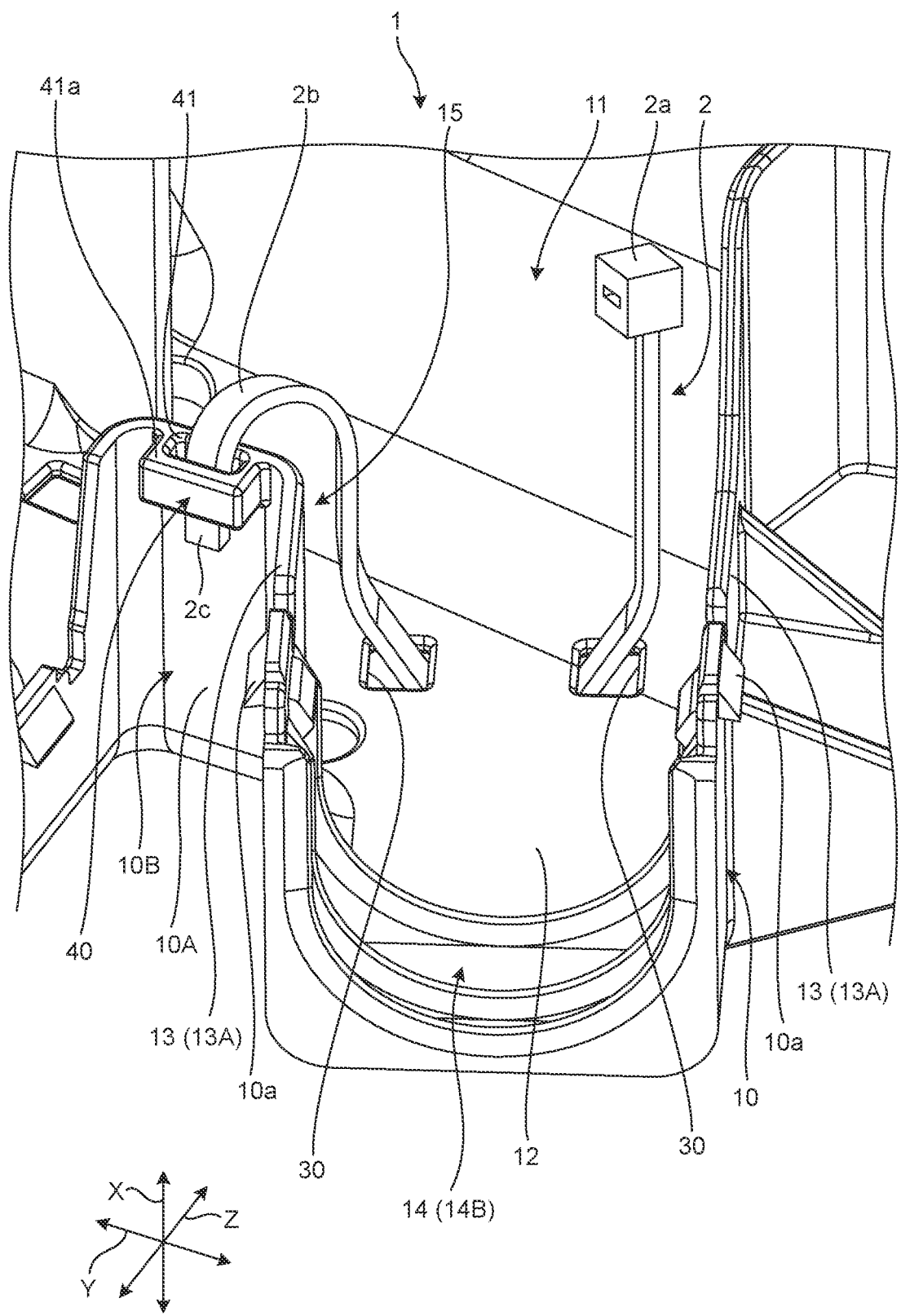
FIG. 5 is a partial perspective view illustrating the wire harness manufacturing method according to the embodiment.

The temporary holding part 40 is provided on an outer surface 10A (the surface opposite to the routing space 11 side) of the base member 10 and is capable of temporarily holding a tip 2*c* of the band part 2*b* (the end opposite to the head part 2*a*) of the binding member 2 in a state in which the binding member 2 is inserted into the insertion holes 30 (see also FIG. 5, for example). The temporary holding part 40 of the present embodiment is formed on the outer surface 10A of a concave portion 10B depressed toward the routing space 11 side in one side wall 13A forming the above-mentioned routing opening 14B. The temporary holding part 40 is provided at the end of the opening 15 side of the first direction X on the cuter surface 10A of the side wall 13A of the base member 10.

The temporary holding part 40 of the present embodiment is formed by an insert hole 41 into which the tip 2*c* of the binding member 2 can be inserted along the first direction X. The insert hole 41 is formed as a space inside a cylindrical part 41*a* projecting from the outer surface 10A of the side wall 13A and formed in a substantially rectangular cylindrical shape. The tip 2*c* of the binding member 2 pulled out from the routing space 11 side along the first direction X toward one side through the opening 15 and folded back to the other side along the first direction X can be inserted into the insert hole 41 along the first direction X, as described below (see FIG. 5, for example). Here, the temporary holding part 40 is located at a distance from the pair of insertion holes 30 to the side wall 13A side (in other words, to the routing opening 14B side) in the direction intersecting an arranging direction of the pair of insertion holes 30 described above, and is located within the range in which the tip 2*c* of the binding member 2 in the state of being inserted into the insertion holes 30 can reach the temporary holding part 40.

With reference to FIGS. 3, 4, 5, and 6, the following is an explanation of the method (wire harness manufacturing method) for manufacturing the wire harness WH configured as described above. The following explanation is based on the flowchart in FIG. 3, while referring to other drawings as appropriate. The method for manufacturing the wire harnesses WH described below may be performed manually by workers using various devices, equipment, jigs, or the like, or it may be performed automatically by various manufacturing devices.

The method for manufacturing the wire harness WH according to the present embodiment includes an insertion step (Step S1), a temporary holding step (Step S2), a routing step (Step S3), a binding step (Step S4), and a closing step (Step S5). This explanation will be made on the assumption that the method for manufacturing the wire harness WH is performed manually by workers.

Figure 4:
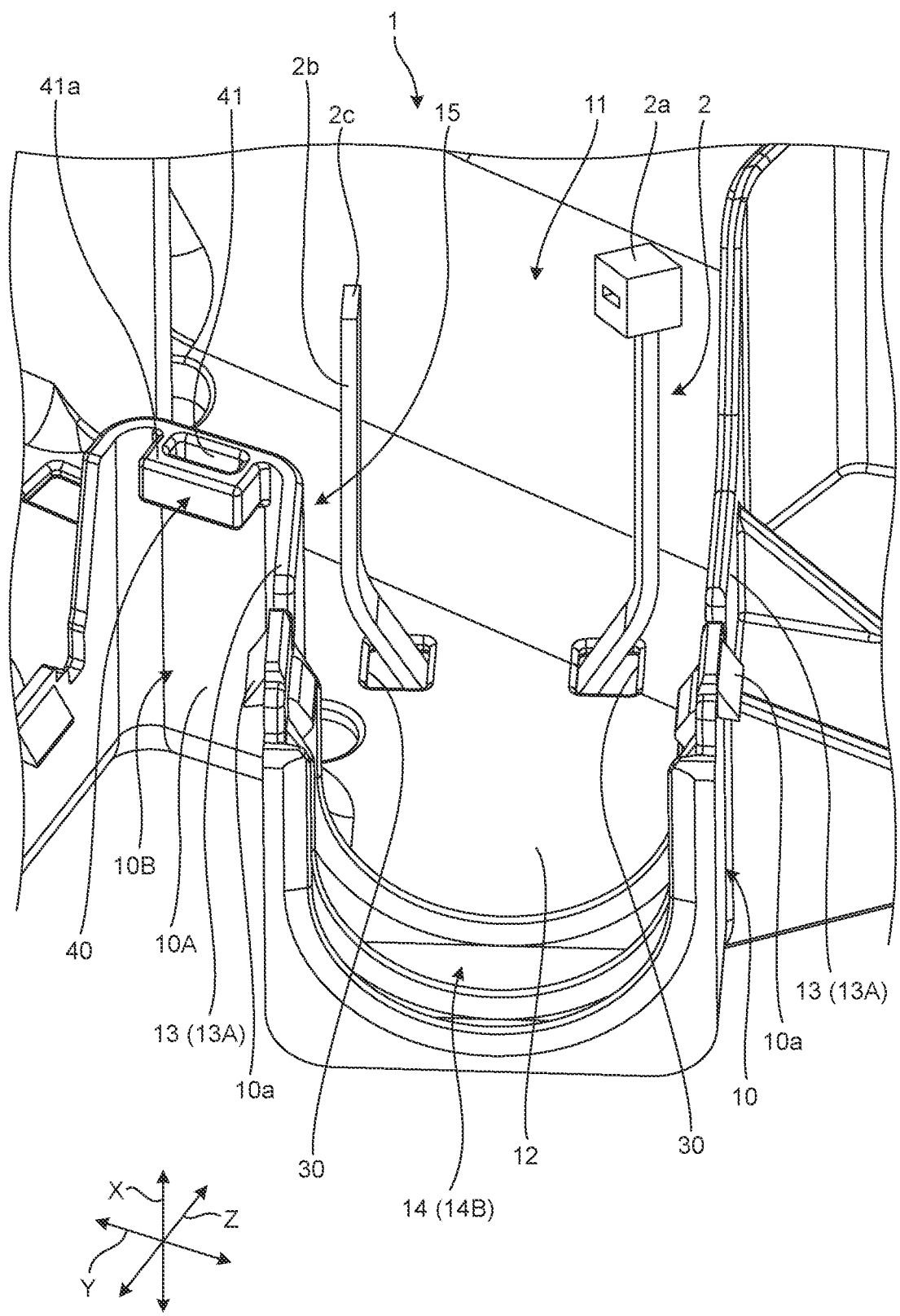
FIG. 4 is a partial perspective view illustrating the wire harness manufacturing method according to the embodiment.

First, as illustrated in FIG. 4, the worker inserts the binding member 2 into the insertion holes 30 as the insertion step (Step S1). Here, in the binding member 2, the tip 2*c* of the band part 2*b* is inserted from the routing space 11 side into the insertion hole 30 on the side distant from the temporary holding part 40 among the pair of insertion holes 30. Thereafter, the tip 2*c* of the band part 2*b* in the binding member 2 is folded outside the routing space 11, and the tip 2*c* of the band part 2*b* is inserted into the insertion hole 30 on the side close to the temporary holding part 40 toward the routing space 11. In this state, the binding member 2 is folded into a substantially U-shape with the band part 2*b* inserted across the pair of insertion holes 30. In this state, the tip 2*c* of the band part 2*b* of the binding member 2 is located on the side of the temporary holding part 40, and the head part 2*a* is located on the side distant from the temporary holding part 40.

Thereafter, as illustrated in FIG. 5, the worker temporarily holds the tip 2*c* of the binding member 2 in the state of being inserted into the insertion holes 30 in the temporary holding part 40 as the temporary holding step (Step S2). Here, the tip 2*c* of the band part 2*b* of the binding member 2 is pulled out toward one side from the routing space 11 side along the first direction X through the opening 15, and folded back toward the other side along the first direction X. The binding member 2 is thereafter temporarily held in the insert hole 41 by insertion of the folded tip 2*c* of the band part 2*b* along she first direction X into the insert hole 41 forming the temporary holding part 40.

Thereafter, the worker routes the electric wires W in the routing space 11 in a state in which the tip 2*c* of the binding member 2 is temporarily held in the insert hole 41 of the temporary holding part 40 as the routing step (Step S3). Here, the electric wires W are routed on the routing path configured across the first routing opening 14A and the second routing opening 14B in the routing space 11.

Thereafter, as illustrated in FIG. 6, the worker removes the tip 2*c* of the binding member 2 in the state of being temporarily held in the insert hole 41 of the temporary holding part 40 from the temporary holding part 40 and binds the electric wires H in the state of being routed in the routing space 11 to the base member 10 by the binding member 2 as the binding step (Step S4). Here, the binding member 2 binds and fixes the electric wires W to the bottom portion 12 by causing the tip 2*c* of the band part 2*b* to be locked in the head part 2*a*, in the state in which the band part 2*b* is wound around the electric wires W and the bottom portion 12 of the base member 10 through the insertion holes 30.

Thereafter, the worker mounts the cover member 20 to the base member 10 and closes the opening 15 with the cover member 20 as the closing step (Step S5), and the method for manufacturing the wire harness WH is finished.

As illustrated in FIG. 7, the cover member 20 of the present embodiment includes a temporary holding cover part 21 covering the temporary holding part 40 in a state in which the electric wires W are bound to the bottom portion 12 of the base member 10 by the binding member 2. The temporary holding part. 40 does not temporarily hold the binding member 2 but is in a released state, in a state in which the electric wires W are bound and fixed to the bottom portion 12 by the binding member 2. The temporary holding cover part 21 covers the temporary holding part 40 in the released state, in a state in which the cover member 20 is mounted to the base member 10 and the opening 15 is covered with the cover member 20. Here, the temporary holding cover part 21 covers the entire cylindrical part 41*a* forming the insert hole 41 from one side of the first direction X.

The manufacturing method, the wire harness WH, and the protective member 1 described above can improve workability when the electric W are routed and bound, by temporarily holding the tip 2*c* of the binding member 2 in the state of being inserted into the insertion holes 30 in the temporary holding part 40 provided on the outer surface 10A of the base member 10 before the electric wires W are routed in the routing space 11 of the base member 10, other words, the manufacturing method, the wire harness WH, and the protective member 1 can prevent the tip 2*c* of the binding member 2 from being entangled in the electric wires W when the electric wires W are routed in the routing space 11, by temporarily holding the tip 2c of the binding member 2 in the temporary holding part 40. Thereafter, the manufacturing method, the wire harness WH, and the protective member 1 can be used to bind and fix the electric wires W to the protective member 1 by the binding member 2 by removing the tip 2c temporarily held in the temporary holding part 40 after the electric wires W are routed in the routing space 11. As a result, the manufacturing method, the wire harness WH, and the protective member 1 described above improve workability when the electric wires W are routed and bound, and allow electric wires W to be properly bound.

In the manufacturing method, the wire harness WH, and the protective member 1 described above, the temporary holding part 40 is formed by the insert hole 41 into which the tip 2c of the binding member 2 can be inserted along the first direction X. With this configuration, the protective member 1 can be configured such that the tip 2c of the binding member 2 can be easily temporarily held in the temporary holding part 40 from the opening 15 side, and the temporary holding part 40 can be configured with an insert hole 41 that is easy to die-cut in molding. As a result, the manufacturing method, the wire harness WH, and the protective member 1 described above can properly bind electric wires W as described above, and can improve the manufacturing efficiency. For example, increase in manufacturing cost can be suppressed.

In the manufacturing method, the wire harness WH, and the protective member 1 described above, the temporary holding part 40 is provided at the end of the opening 15 side in the first direction X on the outer surface 10A of the base member 10. With this configuration, the protective member 1 can be configured such that the tip 2c of the binding member 2 can be easily temporarily held in the temporary holding part 40 from the opening 15 side, and the tip 2c of the binding member 2 temporarily held in the temporary holding part. 40 can be easily removed from the opening 15 side. As a result, the manufacturing method, the wire harness WH, and the protective member 1 described above can further improve the workability when electric wires W are routed and bound, and can bind electric wires W more properly.

In the manufacturing method, the wire harness WH, and the protective member 1 described above, the cover member 20 mounted to the base member 10 and covering the opening 15 includes the temporary holding cover part 21 covering the temporary holding part 40. With this configuration, the protective member 1 can cover the temporary holding part 40 provided on the outer surface 10A of the base member 10 with the temporary holding cover part 21 in a state of use mounted on a vehicle or the like, such that objects around the protective member 1 can be made difficult to get caught in the temporary holding part 40. As a result, the manufacturing method, the wire harness WH, and the protective member 1 described above can properly bind electric wires W, and can secure a more appropriate state of use.

The wire harness manufacturing method, the wire harness, and the protective member according to the embodiment of the present invention described above are not limited to the above-described embodiment, but various changes are possible within the scope of the claims.

In the explanation described above, the protective member 1 is explained as the armor member or the protector, but the structure is not limited thereto. For example, the protective member 1 may be configured as a part of a housing, such as the electrical connection box.

In the explanation described above, the temporary holding part 40 is explained as being located on the side wall 13A side from the pair of insertion holes 30 in the direction intersecting the arranging direction of the pair of insertion holes 30, but the structure is not limited thereto. The temporary holding parts 40 may be located in line with the arranging direction of the pair of insertion holes 30, as long as they are located within the range of the reach of the tip 2c of the binding member 2 in the state of being inserted into the insertion holes 30. In the same manner, the temporary holding part 40 is explained as being provided at the end of the opening 15 side in the first direction X on the outer surface 10A of the side wall 13A of the base member 10. However, the structure is not limited thereto, but the position of the temporary holding part 40 can be any position on the outer surface 10A, as long as the tip 2c of the binding member 2 in the state of being inserted into the insertion holes 30 can reach the temporary holding part 40.

In the explanation described above, the temporary holding part 40 is explained as being formed by the insert hole 41, but the structure is not limited thereto. The temporary holding part 40 may also be formed by, for example, a hook-shaped part, as long as it is a shape that can temporarily hold the tip 2c of the binding member 2.

In the explanation described above, the cover member 20 is explained as including the temporary holding cover part 21, but the structure is not limited thereto. The cover member 20 may be configured without the temporary holding cover part 21.

The wire harness manufacturing method, the wire harness, and the protective member according to the embodiment may be configured by combining the components of the embodiment or modification explained above.

The wire harness manufacturing method, the wire harness, and the protective member of the present embodiment produce the effect of properly binding electric wires.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness manufacturing method comprising:
   an insertion step of inserting a binding member into first and second insertion holes of a protective member, the protective member including a base member forming a routing space in which an electric wire is routed, the first and second insertion holes being provided in the base member and into which the binding member is inserted across inside and outside of the routing space, and a temporary holding part provided on an outer surface of the base member and capable of temporarily holding an end of the binding member in a state in which the binding member is inserted into the insertion hole;
   a temporary holding step of temporarily holding the end of the binding member in the state of being inserted into the insertion hole in the temporary holding part;
   a routing step of routing the electric wire in the routing space in a state in which the end of the binding member is temporarily held in the temporary holding part; and
   a binding step of removing the end of the binding member in the state of being temporarily held in the temporary holding part from the temporary holding part, and binding the electric wire in a state of being routed in the routing space to the base member by the binding member, and wherein the base member includes an opening opened on one side along a first direction in the routing space, and the temporary holding part is formed by an insert hole into which the end of the binding member pulled out from the routing space side along the first direction toward the one side through the opening and folded back to the other side along the first direction is insertable along the first direction.

2. The wire harness manufacturing method according to claim 1, wherein the temporary holding part is provided at an end on the opening side in the first direction on the outer surface of the base member.

3. The wire harness manufacturing method according to claim 2, wherein the protective member further includes a cover member covering the opening, and the cover member includes a temporary holding cover part covering the temporary holding part in a state in which the electric wire is bound to the base member by the binding member.

4. A wire harness manufacturing method comprising:

an insertion step of inserting a binding member into first and second insertion holes of a protective member, the protective member including a base member forming a routing space in which an electric wire is routed, the first and second insertion holes being provided in the base member and into which the binding member is inserted across inside and outside of the routing space, and a temporary holding part provided on an outer surface of the base member and capable of temporarily holding an end of the binding member in a state in which the binding member is inserted into the insertion hole;

a temporary holding step of temporarily holding the end of the binding member in the state of being inserted into the insertion hole in the temporary holding part;

a routing step of routing the electric wire in the routing space in a state in which the end of the binding member is temporarily held in the temporary holding part; and a binding step of removing the end of the binding member in the state of being temporarily held in the temporary holding part from the temporary holding part, and binding the electric wire in a state of being routed in the routing space to the base member by the binding member, and wherein the base member includes an opening opened on one side along a first direction in the routing space, and the temporary holding part is provided at an end on the opening side in the first direction on the outer surface of the base member.

5. The wire harness manufacturing method according to claim 4, wherein the protective member further includes a cover member covering the opening, and the cover member includes a temporary holding cover part covering the temporary holding part in a state in which the electric wire is bound to the base member by the binding member.

\* \* \* \* \*